United States Patent
Fenile et al.

(10) Patent No.: US 9,643,783 B2
(45) Date of Patent: May 9, 2017

(54) RAIL-LED CONVEYING MEANS AND CONVEYING INSTALLATION HAVING SUCH CONVEYING MEANS

(71) Applicant: FERAG AG, Hinwill (CH)

(72) Inventors: Roberto Fenile, Wetzikon (CH); Simon Guhl, Wetzikon (CH)

(73) Assignee: FERAG AG, Hinwil (CH)

( * ) Notice: Subject to any disclaimer, the term of this patent is extended or adjusted under 35 U.S.C. 154(b) by 0 days.

(21) Appl. No.: 14/779,751

(22) PCT Filed: Mar. 19, 2014

(86) PCT No.: PCT/CH2014/000032
§ 371 (c)(1),
(2) Date: Sep. 24, 2015

(87) PCT Pub. No.: WO2014/153675
PCT Pub. Date: Oct. 2, 2014

(65) Prior Publication Data
US 2016/0046444 A1  Feb. 18, 2016

(30) Foreign Application Priority Data

Mar. 28, 2013 (CH) .................................... 00691/13

(51) Int. Cl.
*B65G 47/34* (2006.01)
*B65G 39/18* (2006.01)
(Continued)

(52) U.S. Cl.
CPC ................ *B65G 9/008* (2013.01); *B61B 3/00* (2013.01); *B65G 9/002* (2013.01); *B65G 19/025* (2013.01); *B65G 39/18* (2013.01)

(58) Field of Classification Search
CPC ........ B65G 39/18; B65G 9/008; B65G 17/20; B65G 19/025; B65G 17/485; E01B 25/22
(Continued)

(56) References Cited

U.S. PATENT DOCUMENTS 2,920,581 A  *  1/1960  Cook  ..................... B65G 9/002
                                                        104/107
3,827,367 A      8/1974  Paglia
(Continued)

FOREIGN PATENT DOCUMENTS

DE         1136641        9/1962
DE         1 953 189      1/1967
(Continued)

OTHER PUBLICATIONS

Switzerland Search Report dated Jun. 4, 2013, Application No. CH00691/13.

*Primary Examiner* — James R Bidwell
(74) *Attorney, Agent, or Firm* — Rankin, Hill & Clark LLP

(57) ABSTRACT

A rail-led conveying device includes a conveying vehicle with at least three runner rollers for rolling conveying along a rail guide. Rotation planes of the at least three runner rollers are arranged at an angle of greater than 0° and smaller than 180° relative to one another. The associated conveying installation includes a plurality of such conveying devices as well as a corresponding rail guidance with a rail body. The rail body includes a rail body longitudinal section with three runner surfaces that are arranged on the outer periphery of the rail body and are for the at least three runner rollers of the conveying device. The surface normals of the three runner surfaces are arranged at an angle to one another of greater than 0° and smaller than 180°.

17 Claims, 13 Drawing Sheets

(51) Int. Cl.
*B65G 9/00* (2006.01)
*B65G 19/02* (2006.01)
*B61B 3/00* (2006.01)

(58) Field of Classification Search
USPC ..... 198/465.4, 678.1, 686, 687; 104/93, 110
See application file for complete search history.

(56) References Cited

U.S. PATENT DOCUMENTS

| | | | |
|---|---|---|---|
| 3,999,730 A | 12/1976 | Gonsalves et al. | |
| 4,203,511 A * | 5/1980 | Uhing | B65G 35/063 |
| | | | 104/166 |
| 4,248,157 A | 2/1981 | Evans | |
| 4,372,218 A | 2/1983 | Östlund | |
| 5,050,833 A * | 9/1991 | Usner | A47G 25/32 |
| | | | 198/465.4 |
| 5,141,094 A * | 8/1992 | Speckhart | B65G 47/493 |
| | | | 198/349 |
| 5,146,854 A * | 9/1992 | Poulos | B61C 11/06 |
| | | | 104/93 |
| 6,607,068 B1 | 8/2003 | Walther et al. | |
| 7,686,156 B2 | 3/2010 | Tabler | |
| 2001/0019006 A1 | 9/2001 | Stauber | |
| 2004/0089188 A1 * | 5/2004 | Lechner | E01B 25/26 |
| | | | 104/93 |

FOREIGN PATENT DOCUMENTS

| | | |
|---|---|---|
| DE | 3510955 | 12/1985 |
| DE | 3821214 | 11/1989 |
| DE | 296 11 067 | 10/1996 |
| DE | 200 16 640 | 3/2002 |
| DE | 696 18 599 | 8/2002 |
| EP | 1 045 807 | 10/2000 |
| EP | 1 118 564 | 7/2001 |
| EP | 0 856 480 | 3/2003 |
| EP | 1 169 249 | 9/2004 |
| EP | 1 693 322 | 8/2006 |
| GB | 1 353 155 | 5/1974 |
| WO | 95/27669 | 10/1995 |
| WO | 98/23509 | 6/1998 |

* cited by examiner

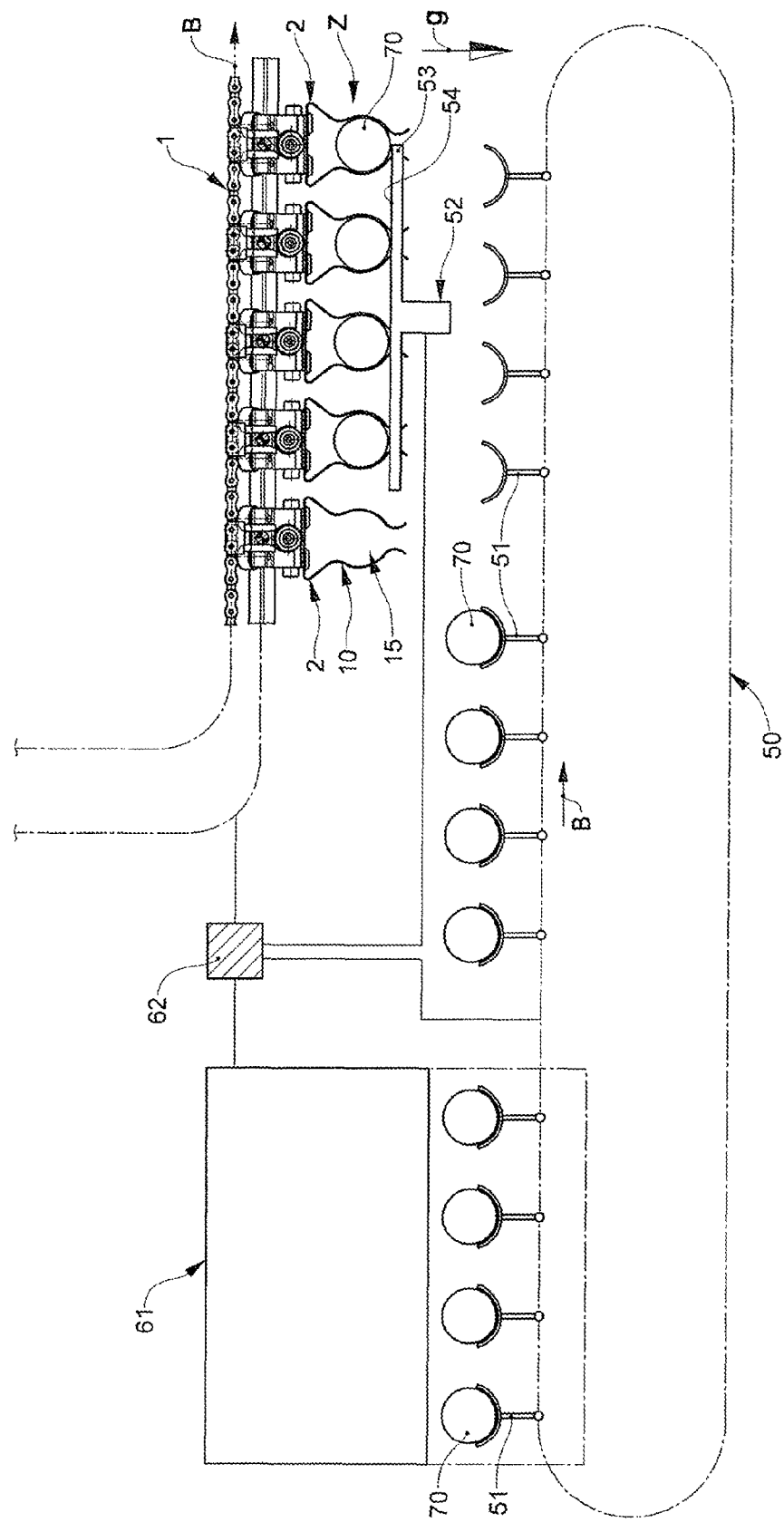

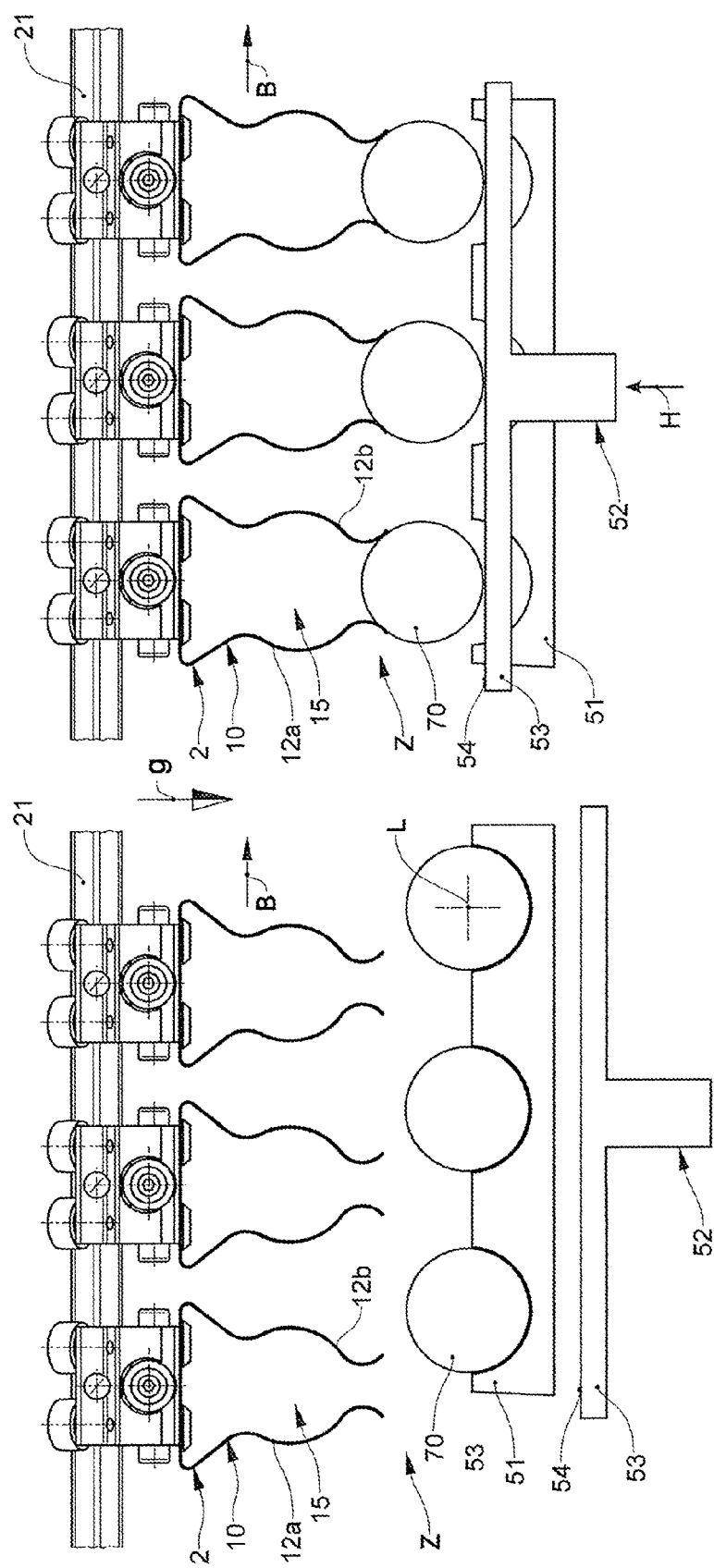

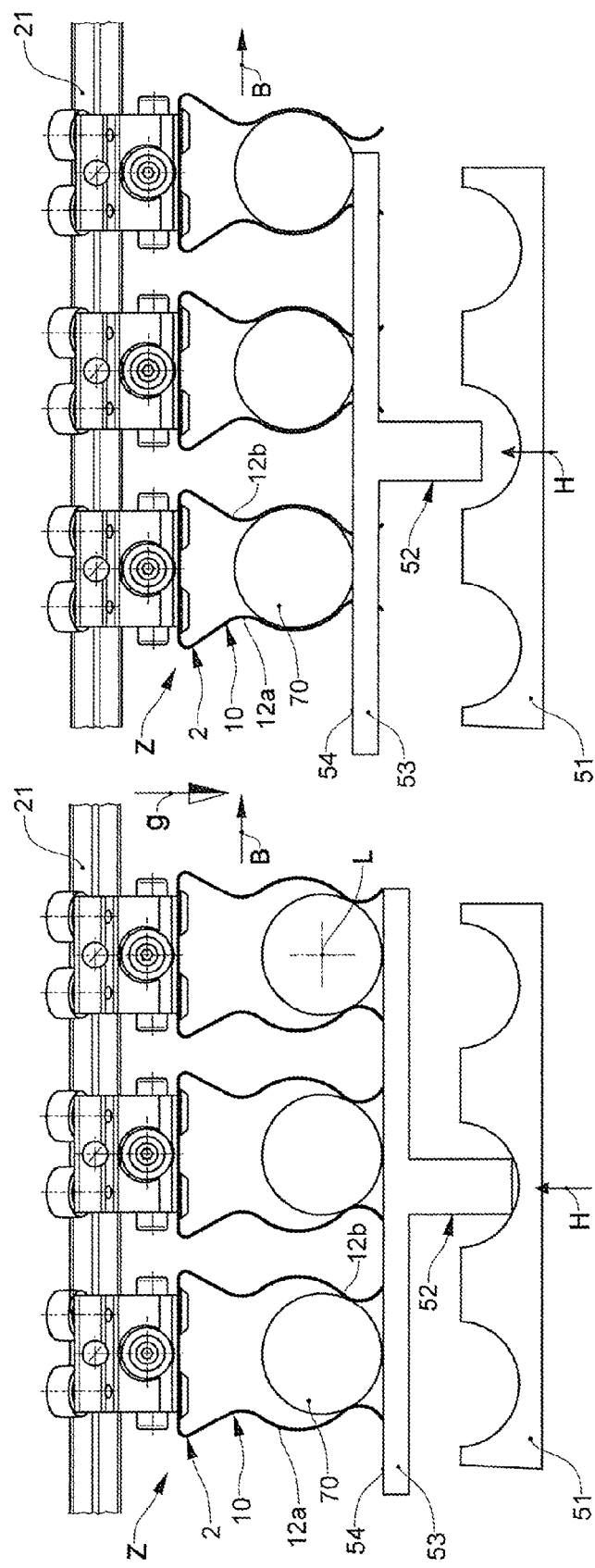

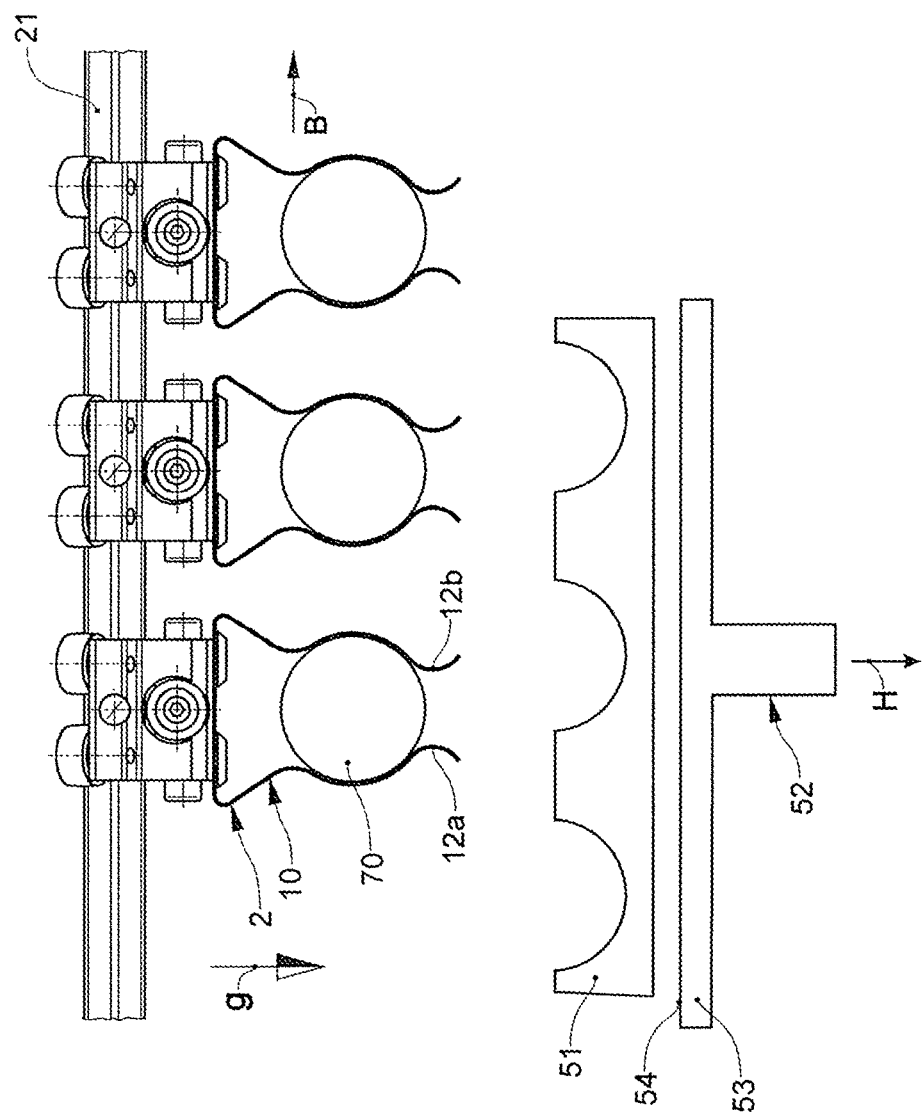

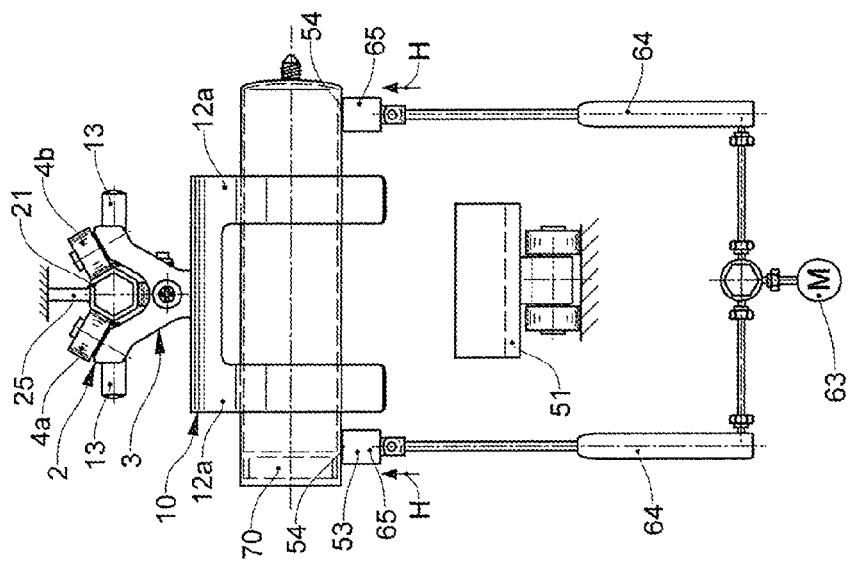
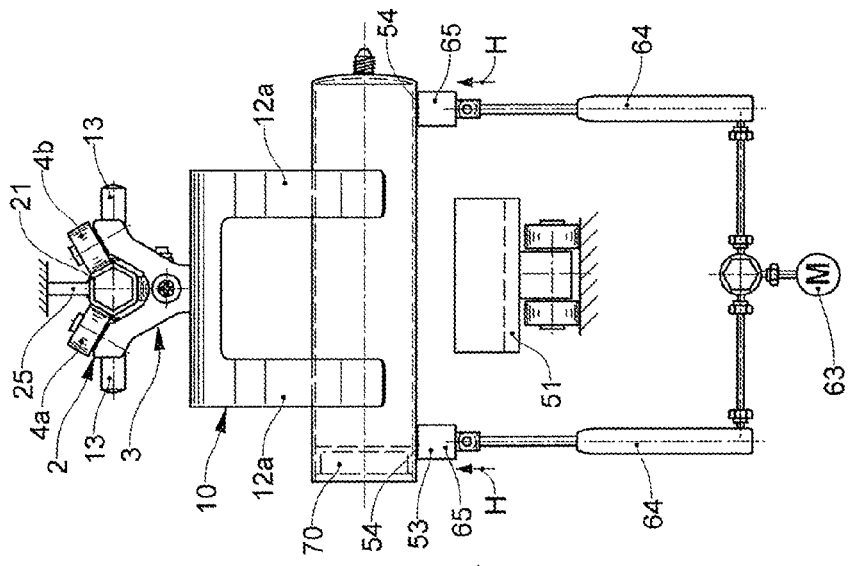
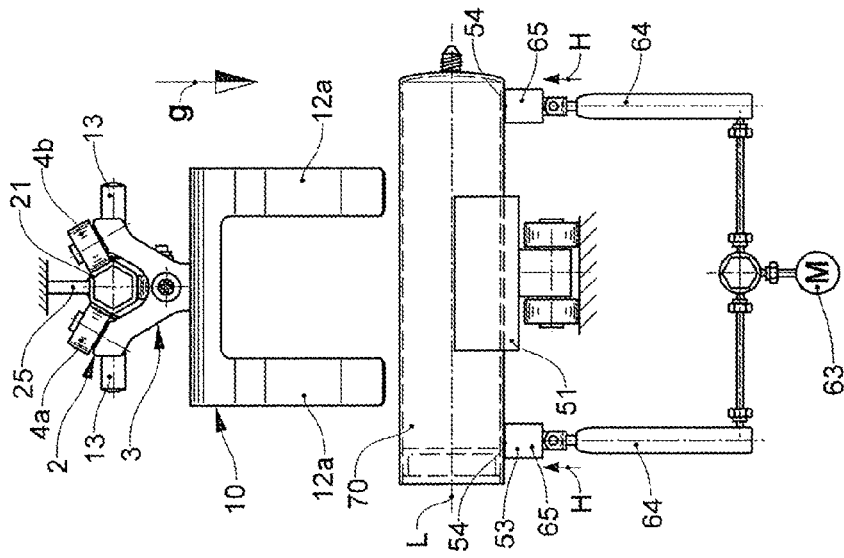

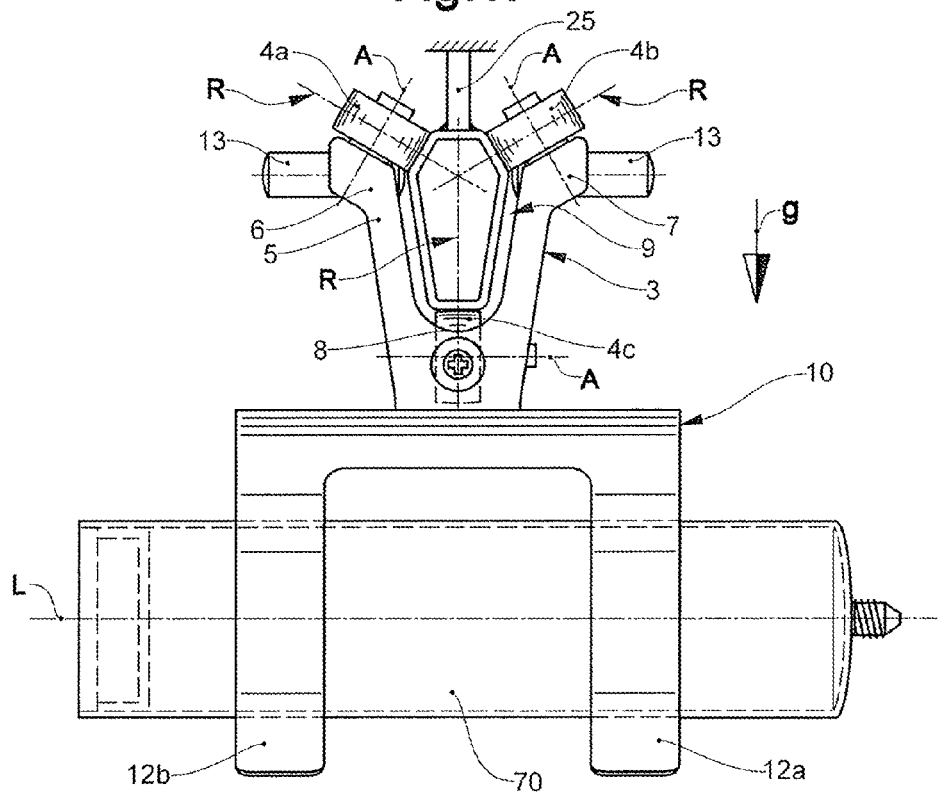
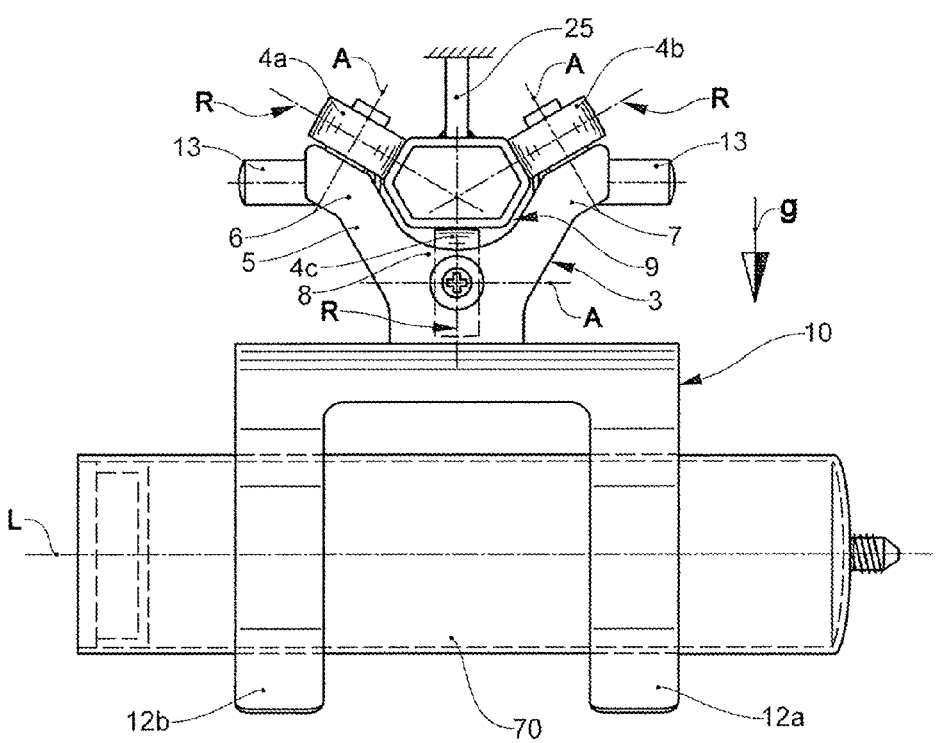

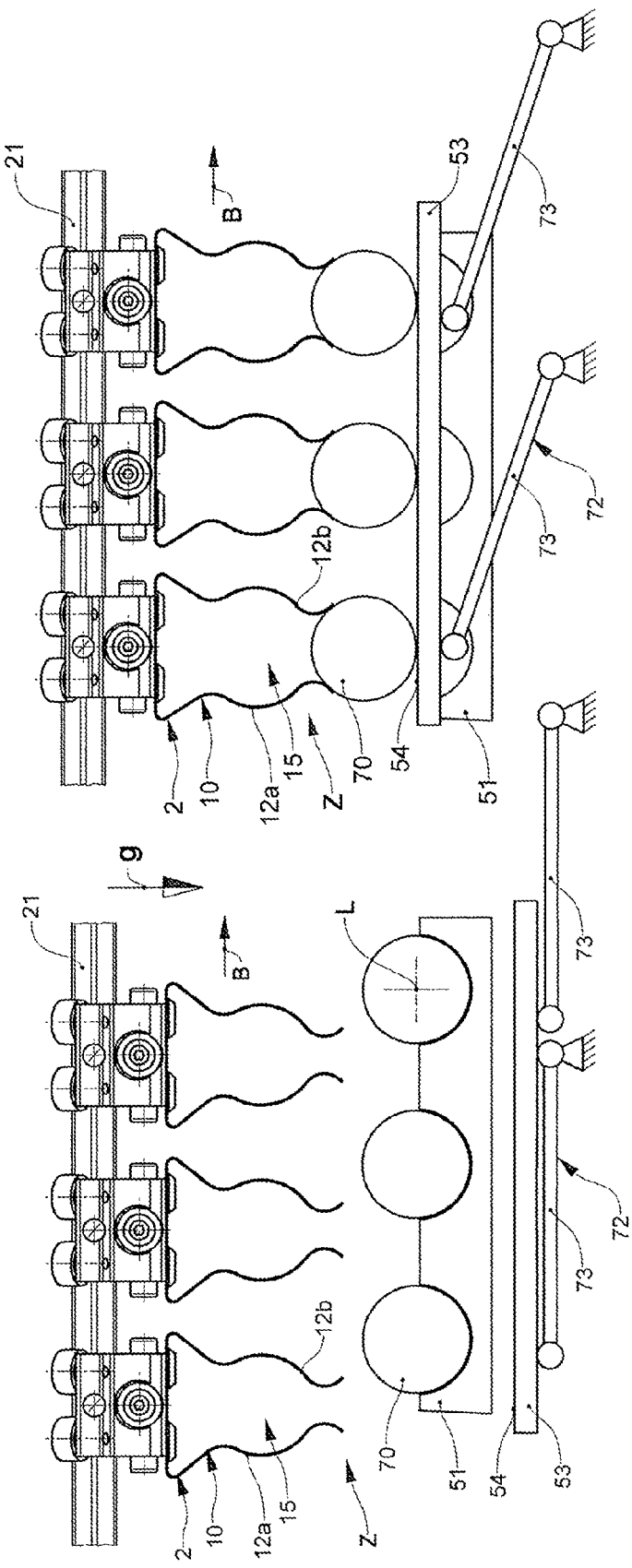

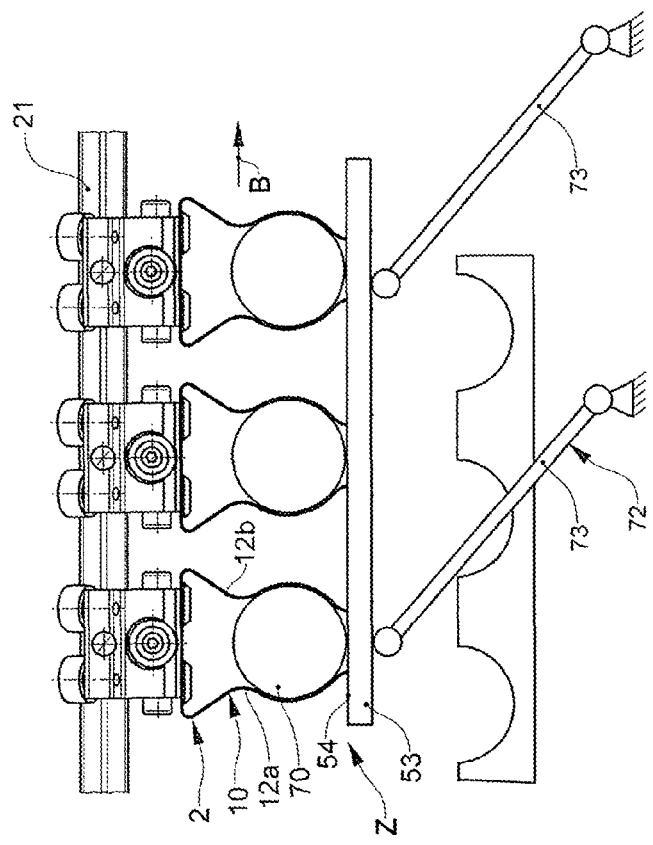
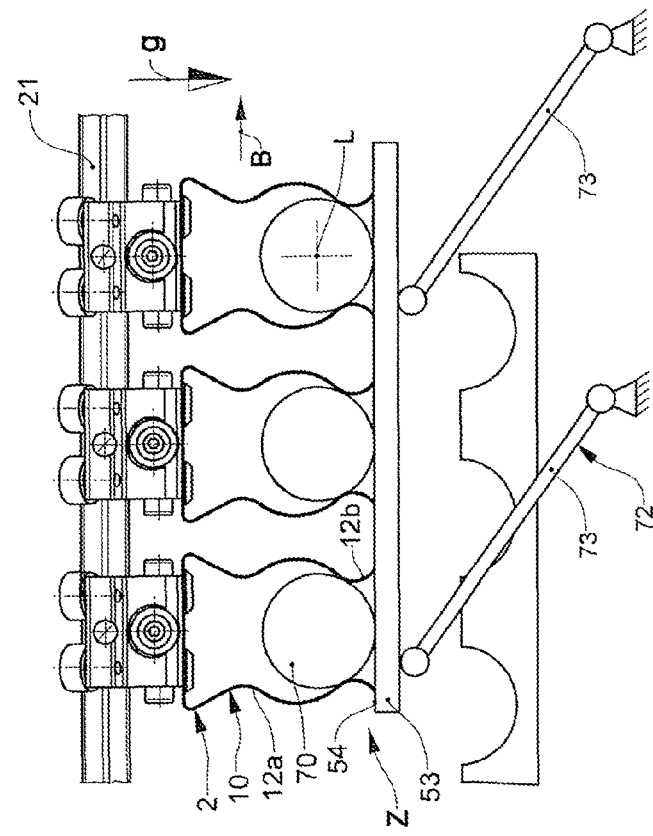

RAIL-LED CONVEYING MEANS AND CONVEYING INSTALLATION HAVING SUCH CONVEYING MEANS

BACKGROUND OF THE INVENTION

Field of the Invention

The invention generally relates to the field of conveying technology and, according to a first aspect of the invention, relates to a rail-led (rail-guided) conveying device including a conveying vehicle with at least one first, second and third runner roller for the rolling conveying along a rail guidance. The invention moreover relates to a conveying installation having at least one rail-led conveying device as well as a rail guidance with a rail body.

A second aspect of the invention relates to a device and to a method for the transfer of piece goods (unit loads) to a conveying installation, in particular of the type mentioned above. The conveying installation includes at least one conveying element that is moveable along a conveying path and that is for holding and conveying a goods piece. The device includes at least one goods piece receiver for positioning and preparing a goods piece in a transfer zone of the conveying installation.

Description of Related art

Conveying devices with rail-led conveying means that are guided or led along guide rails via runner rollers or sliding elements are known in the art. The associated conveying means, for example, are designed in the form of conveying vehicles. Such conveying devices are, e.g., designed as gravity conveyors. With these devices, the conveying vehicles are moved via drivers (catches) to a higher conveying level, from where these move along the guide rail in a manner driven by gravity. Conveying elements are coupled to the conveying vehicles in each case and receive the piece goods to be conveyed and convey these along a conveying path which is set by the guide rail.

The mentioned conveying devices have the advantage that the conveying vehicles can be moved along a conveying path individually, i.e. independently of one another, as well as in a manner directly or indirectly coupled to one another in an interconnection. Thus, the conveying vehicles, for example, can be coupled to one another in a direct manner via suitable connection interfaces, or indirectly by way of chain-led drivers. Conveying vehicles that are coupled to one another, e.g., permit a cyclically synchronous conveying of piece goods.

EP 0 856 480 B1 describes a rail-led conveying means as well as a conveying device with a plurality of rail-led conveying means. The conveying means comprises a conveying vehicle with runner rollers. The base body of the conveying vehicle comprise two limbs. In each case two runner rollers arranged offset equally and oppositely in a crossed manner are fastened on the sides of the vehicle limbs which are assigned to one another. The runner rollers are arranged mutually distanced in the running direction of the vehicle limbs in a manner such that a flat guide rail has space between the runner rollers. The runner rollers roll along on the two flat sides which lie opposite one another.

The conveying device according to EP 0856 480 B1, however, has the disadvantage that the conveying vehicles at the two lateral connection sides connecting the flat sides to one another are not led via runner rollers. Although the runner rollers each comprise a wheel flange, so that the conveying vehicle bears on the connection sides of the guide rail in a largely play-free manner also with respect to the forces acting transversely to the conveying direction, this lateral guidance however entails a comparatively high friction and, accordingly, high wear.

EP 1 169 249 B1 describes a method and a device for conveying piece goods. The piece goods are loaded on holding means, conveyed in a manner held by the holding means, and unloaded from the holding means. The piece goods are pushed into the holding means or out of the holding means transversely to the conveying direction. The holding means can be opened and closed for this. The pushing movement is effected parallel to the longitudinal axis of the piece goods via an object guidance.

SUMMARY OF THE INVENTION

An object according to the first aspect of the invention is to provide a rail-led conveying device and a conveying device with a rail-led conveying device of the initially mentioned type, which overcomes the disadvantages mentioned above. The conveying vehicle and the associated guide rail in particular should be designed such that the guidance accommodates a torque acting on the conveying vehicle, without excessive friction forces acting on the components and in particular on the runner rollers. Moreover, the forces acting on the conveying vehicle should be distributed as uniformly as possible onto the runner rollers.

In accordance with the present invention, a conveying device wherein rotation planes of the at least first, second and third runner roller are arranged relative to one another at an angle of greater than 0° and smaller than 180° (angle degrees). This means that the rotation planes of the first and second, of the second and third as well as the first and second runner roller are in each case arranged at the mentioned angle relative to one another.

The rotation planes are preferably arranged at an angle of 60° or larger, in particular 90° or larger, advantageously 100° or larger and particularly preferably of 115° or larger, relative to one another.

The rotation planes are further preferably arranged at an angle of 160° or smaller, in particular 140° or smaller and advantageously 125° or smaller, relative to one another.

The rotation planes in particular are arranged at an angle of 120° relative to one another.

The rotation plane of the runner rollers according to definition lies parallel to the rotation direction of the runner rollers and leads through their middle plane. The rotation axis of the runner roller accordingly forms the surface normal of the rotation plane.

The runner rollers form a rotation axis. The runner rollers are preferably rotatably mounted about a pivot (physical rotation axis). The conveying load thereby is preferably transmitted via the pivot from the conveying means onto the rail guidance. The mounting of the runner rollers can, e.g., consist of a ball bearing.

The conveying vehicle can also include two or more than two first and/or two or more that two second and/or two or more that two third runner rollers. The number of runner rollers amongst other things depends on carrying load to be expected. The greater the carrying load the more rollers are preferably to be provided, in order distribute the load onto several rollers.

The rotation planes of the first, second and third runner rollers intersect relative to one another at an angle mentioned above. The rotation axes of the first, the second and the third runner rollers are at an angle to one another. All three rotation axes can also lie in a common plane transverse to the conveying direction.

If the conveying vehicle includes several first, second and/or third rollers, then these runner rollers each have a common rotation plane.

The conveying vehicle has a base body, on which the runner rollers are rotatably fastened. The base body forms a front end surface, which is at the front considered in the conveying direction, as well as a rear end surface.

Damping elements, which damp impacts when two conveying vehicles moved independently of one another collide, can be arranged on the base body, in particular on its end surfaces.

According to a further development of the invention, the conveying vehicle includes a first and a second vehicle limb as well as a connection section that connects the two vehicle limbs to one another.

The two vehicle limbs and the connection section form the base body. The base body is designed in a one-part manner. The base body can be Y-shaped in a cross-sectional view.

At least one first runner roller is arranged on the first vehicle limb, at least one second runner roller on the second vehicle limb and preferably at least one third runner roller on the connection section, in a rotatably mounted manner.

Also two or more than two first runner rollers can be arranged on the first vehicle limb. The two or more first runner rollers can be arranged one after the other in the conveying direction of the conveying vehicle.

Likewise, two or more than two second runner rollers can be arranged on the second vehicle limb. The two or more second runner rollers can be arranged one after the other in the conveying direction of the conveying vehicle.

Also two or more than two third runner rollers can be arranged on the connection element. The two or more third connection rollers can be arranged one after the other in the conveying direction of the conveying vehicle.

The arrangement of two or more first, second and/or third runner rollers serves for avoiding a tilt moment in the conveying direction of the conveying vehicles, which are moved independently of one another along a conveying path.

The two vehicle limbs and the connection section preferably enclose a rail receiving space, which is open at one side and is for receiving a rail body. The at least one first, second and third runner roller are arranged on the conveying vehicle such that they can roll on the rail body, which is led through the rail receiving space.

The at least one first, second and third runner roller are preferably arranged on the conveying vehicle such that their rotation planes intersect in the rail receiving space.

A conveying element for receiving or holding a goods piece is preferably arranged on the conveying vehicle. The conveying element can be connected to the conveying vehicle via a releasable or non-releasable connection. The conveying element is preferably connected to the conveying vehicle via the connection section.

The conveying element is preferably a holding clip. The holding clip includes at least two clip limbs for the clamped holding of the goods piece. At least one clip limb, preferably both clip limbs are movable. The two clip limbs are movable relative to one another.

Clamped holding means that the goods piece is held by the holding clip by way of a friction-fit connection and/or positive-fit connection.

The holding clip can be activated in an active or passive manner "Actively activatable" means that the holding clip, by way of movement of the clip limbs relative to one another, can be actively opened and closed via a cam guide or switch station that is integrated into the conveying installation. In this case, the holding clip can, e.g., be designed as a gripper.

The holding clip is preferably passively activatable. "Passively activatable" means that the holding clip can be passively opened by way of spreading the clip limbs, for example by the goods piece to be conveyed, and can be passively closed again by way of the restoring force of the clip limbs. The holding clip in particular is designed such that the clip limbs in the spread position exert a restoring force in the direction of an initial position, the restoring force permitting the clamping holding of a goods piece.

The conveying element, however, can be a holding pouch, a holding bag, a holding sack, a holding hook, a holding basket, a holding crate or a holding plate.

For this, the clip limbs can be designed in a spring-elastic manner. However, a spring element can also be provided, which cooperates with the clip limbs and exerts a restoring force onto these.

The clip limbs or the holding clip is preferably manufactured of spring steel. The clip limb or the holding clip can, however, also be of plastic. The holding clip is preferably designed in a single-piece manner.

The holding clip is preferably formed such that the clip limbs are only activated passively. In other words, the clip limbs are actuated by the goods piece inserted between the clip limbs. The clip limbs are not actively actuated, i.e. by a cam guide or a switch device.

The conveying vehicles are designed as independent conveying elements. The conveying vehicles are designed such that they cannot be linked to one another.

A contact element for creating a driving contact (catching, taking-along contact) with a driver (catch) for the purpose of driving (catching, taking-along) the conveying vehicle by the driver can be arranged on the conveying vehicle.

The contact element, e.g., can be designed as a stud. The stud is designed to be brought into driving contact with a driver, as described further below.

The invention according to the first object also relates to a conveying installation which includes at least one, preferably a plurality of conveying means according to the invention.

The conveying installation has a rail body that forms at least one rail body longitudinal section with at least three runner surfaces, which are arranged on the outer periphery of the rail body, and are for the at least one first, second and third runner roller. The surface normals of the at least three runner surfaces intersect at an angle larger than 0° and smaller than 180° (angle degrees). Accordingly, the surface normals of the first and second, of the second and third, as well as of the first and third runner surface are in each case arranged relative to one another at the mentioned angle.

The surface normals of the at least three runner surfaces preferably intersect at an angle of 60° or larger, in particular 90° or larger, advantageously 100° or larger and particularly preferably of 115° or larger.

The surface normals of the at least three runner surfaces moreover intersect preferably at an angle of 160° or smaller, in particular 140° or smaller and advantageously of 125° or smaller.

The surface normals preferably intersect at an angle of 120°.

The runner surfaces are preferably designed as strips. The strips can be part of the plane.

According to a preferred further development, the rail body longitudinal section has a symmetrical cross section.

According to a preferred further development the rail body longitudinal section is a polygonal profile, i.e. a triangular profile with three profile surfaces, or a hexagonal profile with six profile surfaces, wherein the at least three runner surfaces are formed by profile surfaces. The polygonal profiles can be designed as regular, which is to say point-symmetrical profiles.

The profile corners of the polygonal profiles are preferably rounded. The danger of injury is reduced in this manner.

The hexagonal profile can be designed in a mirror-symmetrical or point-symmetrical manner in cross section. In the latter case, the hexagonal profile forms a profile cross section in the form of a regular hexagon.

The hexagonal profile is preferably of a nature such that adjacent profile surfaces are arranged in each case at an angle of 120° relative to one another. The hexagonal profile as a result has a hexagonal cross section.

The three runner surfaces are preferably formed by in each case three profile surfaces, which are arranged to one another in an angled manner, in particular at an angle of 60°. Accordingly, the first and second, the second and third as well as the third and first running surface in each case enclose the mentioned angle.

The conveying vehicle with its two vehicles limbs laterally encompasses the rail body or grips around this laterally. The at least one first, second and third runner roller are rollingly guided on the runner surfaces of the rail body. The runner rollers encompass the rail body in a manner that is practically free of play.

One also talks of an "outer runner", since the runner surfaces are arranged on the outer periphery of the rail body, and the conveying vehicle with its runner rollers accordingly rolls on the outer periphery of the rail body.

The rail body and the single or more conveying devices are preferably designed such that a torque acting on the conveying device is dissipated onto the rail body in a manner uniformly distributed over the at least one first, second or third runner roller.

The rail body is connected to a carrier structure via holding means, which are preferably fastened on one of the profile surfaces. The conveying device is therefore designed such that this does not enclose or encompass at least this one profile surface. This profile surface usefully lies between the two limb ends on the open side of the conveying vehicle.

The cross-sectional geometry of the rail body can be constant or vary along the conveying path. Thus, the rail body can include several rail body longitudinal sections with a different profile cross section.

Thus, the rail body, for example, can include a further rail body longitudinal section, which is designed as a round profile. The round profile preferably has a circular cross section. The round profile preferably connects to a hexagonal profile. Preferably, the hexagonal profile via an intermediate section merges into the round profile by way of a continuous cross-sectional change, and vice versa.

Rail body longitudinal sections of round profiles in particular can be applied in curve regions, in which the rail body forms a bend.

Since the runner rollers with the round profile form a line contact, these cannot accommodate torques. This means that the conveying means are pivotable about the rail body. This effect is desirable in curved travel since here quite high centrifugal forces act on the conveying device, depending on the conveying speed. The centrifugal forces are directed so as to exert a torque onto the conveying means led into the curve, depending on the leading of the rail.

The conveying device now in curved travel can pivot out in a manner following the centrifugal force. High torques acting on the conveying means an in particular on the runner rollers, which leads to a greater friction and wear, is prevented in curved travel by way of this. The conveying device as a result are loaded to a significantly lower extent due to the free alignment with curved travel, which is to say travel in bends.

If for example a hexagonal profile is used in a bend along a conveying path, then the conveying device are not in the position of changing their alignment transversely to the rail body in a manner following the centrifugal force. Accordingly, high torques act on the runner rollers and lead to a wear and abrasion of the bearings. The rail body subsequent to a bend or curve can again merge into a hexagonal profile, along which the conveying device is again secured with regard to torque.

The rail body can be a solid profile. The rail body in particular can be a hollow profile. The hollow profile can, e.g., be an extruded profile. The rail body can be of metal, such as steel or aluminium, or of plastic.

If the rail bodies are designed as hollow profiles, then two rail bodies can be connected to one another via plug-in connections. The plug-in connection between two rail bodies can include a plug-in element that is inserted into the profile cavity of the plug-in bodies and, thus, connects these to one another. The connection can be a positive connection and/or non-positive connection. The plug-in element can be fixed in the profile cavity via fixation means, such as screws, which are inserted laterally through the profile wall of the rail body.

The rail body further preferably has a width across flats or wrench size of 10 to 100 mm, preferably of 10 to 50 mm, and in particular of 20 to 30 mm. The width across flats with a hexagonal profile corresponds to the distance between two runner surfaces lying opposite one another. The width across flats with a round profile corresponds to the outer diameter of the profile. The width across flats is preferably constant over the complete longitudinal extension of the rail body. The width across flats of the round profile preferably corresponds to the width across flats of the hexagonal profile.

The conveying installation is preferably designed as a hanging conveyor, in which piece goods at least in sections are conveyed in a hanging manner. The piece goods are preferably conveyed for the most part in a hanging manner along the conveying path. In the hanging conveying, the connection section and the conveying element are arranged below the rail body with regard to the gravity. The two vehicles limbs are led upwards from below laterally past the rail body. The vehicle is accordingly open to the top.

The conveying installation according to the invention can, e.g., be designed as a gravity conveyor. With these installations, the conveying vehicles are moved from a higher conveying level (potential level), driven by gravity, along the guide rail downwards to a lower conveying level (potential level).

The conveying vehicles are driven by gravity, in particular independently of one another.

The conveying vehicles can be moved via drivers to the higher conveying level (potential level).

The gradient along the gravity conveying path can be e.g. 1° to 45°, in particular 1° to 15° (angle degrees).

The conveying installation in particular is designed as a circular course. The circular course can include branching. In particular, points (diverters) can be arranged at the branching. The conveying vehicles can be moved along different conveying paths in this manner.

According to a further development of the invention, the conveying installation comprises a drive device. The drive device in particular is a flexible drive element and one which is designed in a revolving manner. The drive device can, e.g., be a chain, a belt, such as toothed belt, a cable, a band or a strap.

Preferably, drivers are connected or actively connected to the drive device. The drivers include a contact element, via which this can be brought into contact with the contact element of the conveying vehicle. The contact element can also be arranged directly on the drive device or be actively connected to this.

The drive device can also be worm gear (worm wheel) of a worm drive. The worm gear can comprise a spirally arranged groove, into which the contact element of the conveying vehicle engages. In this case, the spiral groove corresponds to the driver. The spiral groove rotates by way of rotation of the worm gear. In this manner, the conveying vehicle together with the contact element, which is freely displaceably guided in the spiral groove is conveyed along the rotation axis of the worm gear.

The drive device with the driver and described above, in particular can be applied in the transfer zone and accordingly be arranged there. The drive device ensures a uniform movement of the conveying vehicles into the transfer zone and out of this. Moreover, the drive means permits defined distances between the conveying vehicles. This is particularly important with regard to a reliable transfer of the piece goods.

The conveying vehicle, as already mentioned, on the one hand includes a contact element, which interacts with the contact element of the driver for creating a driving contact.

The contact elements of the conveying vehicle and the driver can be designed in a manner such that these create a positive, non-positive and/or friction connection or merely a driving contact, between the conveying vehicle and the driver.

The contact elements can be coupling elements, via which the conveying vehicle is coupled to the driver.

The contact element on the conveying vehicle can be a stud. The contact element on the driver can be designed of two driver arms that form a gap for receiving the stud. Other contact elements such as magnets or a Velcro-type closure are also possible.

The conveying device or its conveying element is preferably suitable for receiving elongate piece goods. The elongate piece goods have a longitudinal axis. The piece goods are preferably rigid.

The piece goods preferably have a rotationally symmetrical shape, preferably cylindrical shape. The piece goods can, for example, be blanks, cartridges, glasses, bottles, tins, cardboard packages, such as biscuit tins, rod-like products such as sweets, tubes or cigars.

A second aspect of the invention relates to a device for the transfer of piece goods to a conveying installation that includes at least one conveying element, which is movable along a conveying path and is for holding and conveying a goods piece. The device for this includes at least one goods piece receiver for positioning a goods piece in a transfer zone of the conveying installation.

The object according to the second aspect of the invention is to provide a device mentioned above, which is constructed as simply as possible, is robust and despite this is reliable in operation. Moreover, the device should be able to be operated with as little as possible control effort.

This object is achieved by way of the device including a slide mechanism (push mechanism) with at least one slide element (push element), by way of which the at least one goods piece, in a transfer movement can be moved from the goods piece receiver to the conveying element and transferred to the conveying element.

The associated method according to the invention, for transferring piece goods to a conveying installation by way of the device according to the invention comprises the following steps:
providing at least one goods piece in a goods piece receiver in the transfer zone;
moving the at least one goods piece out of the goods piece receiver to the conveying element of the conveying installation;
transferring the at least one goods piece to the conveying element and conveying the at least one goods piece out of the transfer zone.

The conveying element thereby exerts a holding force on the goods piece.

According to the method, the at least one goods piece is moved by way of a slide element of a slide mechanism in a transfer movement transversely to its longitudinal axis out of the goods piece receiver, to the conveying element.

The goods piece is moreover preferably moved transversely to the conveying direction of the goods piece receiver or of the intermediate conveyor and transversely to the conveying direction of the conveying installation.

The at least one goods piece is pushed by the transfer movement of the slide element, preferably out of the goods piece receiver, to the conveying element.

The at least one goods piece is moved by way of the slide element preferably out of an idle position in the goods piece receiver, to the conveying element. Thus, the at least one goods piece is preferably conveyed in the goods piece receiver into the transfer zone and assumes an idle or waiting position there. The transfer takes place from the idle position However, it is also possible for the at least one goods piece during its conveying to be transferred through the transfer zone. This means that the goods piece is situated in a movement in the conveying direction B when this is transferred by the slide mechanism out of the goods piece receiver to the conveying element.

The slide element can, e.g., be moved by way of pneumatic or hydraulic means. The slide element can also be moved via an eccentric device.

The slide element can also be moved via a pivot element. Thereby, the slide element moves along an arched path. The slide element executes a combined movement, with a first movement component in the direction of the conveying element. The second movement component is preferably in the conveying direction of the conveying element.

The slide element can execute a linear movement, a pivot movement or a combined movement. A linear movement can also be a lift movement with a forward travel for moving the goods piece to the conveying element, or for inserting the goods piece into the conveying element, and with a return travel for moving the slide element back into its initial position.

The conveying element preferably includes a holding clip with a first and with a second movable clip limb, as has already been described further above.

The goods piece receiver is preferably part of the conveying element of an intermediate conveyor, which conveys the piece goods from a processing device, such as, e.g., a filling installation, into the transfer zone. The intermediate conveyor is, e.g., designed as a round course. The intermediate conveyor can, e.g., also be a chain conveyor. The goods piece receiver in particular can be a conveying element of a conveying device. The conveying device can, for example, include a conveying vehicle. The conveying device can include one or more conveying elements or goods piece receivers.

The intermediate conveyor conveys the piece goods preferably in batches or charges into the transfer zone in a discontinuous manner. This means that a conveying break is applied between two conveyed charges of piece goods. Moreover, the piece goods in the transfer zone preferably assume an idle position during the conveying break before their transfer.

The piece goods are preferably transferred as a charge in a constant formation from the goods piece receivers to the conveying elements.

The goods piece receiver preferably forms a rest element, on which the goods piece lies on account of gravity. The goods piece is preferably not held in the goods piece receiver.

The goods piece receiver in the transfer zone, with regard to the direction of the gravitational force, is preferably arranged below the conveying element of the conveying installation which is moved past. The goods piece receiver, however, in the transfer zone can also be arranged laterally of the moved past conveying element.

According to a preferred further development of the invention, the device or the intermediate conveyor includes a plurality of goods piece receivers. The device is hereby designed for the simultaneous transfer of several piece goods to conveying elements of the conveying installation.

The device in particular can include a conveying installation as well as associated conveying device with conveying elements of the type described above. With regard to piece goods, it is likewise preferably the case of piece goods of the type described above.

According to a further development of the invention, the conveying element is moved further along its conveying path during the transfer of the goods piece. The movement of the conveying element or its conveying device during the transfer is preferably continuous or uniform.

However, one can also envisage the conveying element in the transfer zone being temporarily stopped or being slowed down in its movement, for the purpose of taking over the goods piece.

According to a further development of the invention, the conveying element includes a holding clip with two movable clip limbs. The clip limbs can be spread apart, wherein these exert a restoring force in the direction of the initial position. The goods piece according to this further development is pressed by the slide element into the holding clip. With this procedure, the clip limbs are spread apart, so that they exert a restoring force and the goods piece is held in the holding clip in a clamped manner. The holding clip thereby is designed such that the goods piece spreads the clip limbs apart in the holding position.

According to a further development of the invention, the moved conveying element exerts a driving force (catching force) onto the goods piece during the take-over of the goods piece. If the conveying element is a holding clip, this driving force is exerted onto the goods piece as soon as this is pushed by the slide element between the clip limbs. Hereby, one is to ensure that the driving force is already exerted onto the goods piece before this is located in the holding position on the conveying element, i.e. between the clip limbs.

The driving force has the effect that the goods piece receives a movement impulse in the movement direction of the conveying element of the conveying installation and accordingly moves in this conveying direction, and specifically already before the goods piece is held by the conveying element in its holding position.

In this phase, the goods piece executes a combined movement. On the one hand it is moved by the slide element in the direction of the conveying element. On the other hand the goods piece is moved by the driving force already in the conveying direction of the conveying element.

In order to provide for this combined movement, the slide element preferably forms a guide surface that runs in the movement direction of the conveying element in the transfer zone. The goods piece during the take-over now slides along this guide surface in the movement direction of the conveying element, due to the driving force of the conveying element. The guide surface for this is preferably designed as a sliding surface. The sliding surface can be coated, e.g., with a material such as PTFE which has a low coefficient of friction.

Due to this measure, it is ensured that the slide element can push the goods piece completely into the holding position of the conveying element, without inhibiting the movement of the goods piece in the conveying direction of the conveying element, the movement being caused by the driving force.

The guide surface of the slide element is preferably formed by a component extending in the movement direction of the conveying element.

According to a further development of the invention, the slide element moves the goods piece upwards from below, to the conveying element. According to this embodiment, the conveying element forms a hanging conveying in the transfer zone.

However, it is also possible for the slide element to move the goods piece with a sideward movement, to the conveying element. The slide element guides the goods piece preferably during the complete transfer. However, the sliding element preferably does not fix or hold the goods piece for this purpose. For this reason, the slide element and the transfer process are preferably designed such that the goods piece during the guided transfer bears on the slide element or its guide surface due to the support of gravity.

According to a further development of the method, several piece goods are simultaneously moved by way of the slide mechanism, to conveying elements of the conveying installation and are taken over by these. The device comprises a corresponding number of goods piece receivers for this. The goods piece receivers can be designed as independent conveying device or part of an individual conveying device, in particular of an intermediate conveyor.

The conveying installation comprises a suitable number of conveying device with conveying elements. The conveying elements are moved into the transfer zone in such a coordinated manner, that a conveying element is assigned to each goods piece receiver on transfer.

According to a further development of the invention, several piece goods are transferred by way of a common slide element to the conveying elements in a simultaneous, i.e. cyclically synchronous manner Thus, for example, according to a particular further development of the invention, in each case several piece goods per processing cycle are simultaneous subjected to a processing step in a processing device. The piece goods after completion of the processing step are conveyed in goods piece receivers by way of intermediate conveyors, preferably together, to the transfer zone. The piece goods in the transfer zone by way of the slide mechanism are simultaneously, i.e., cyclically synchronously moved to the conveying elements of the conveying installations and transferred to these.

The transfer of the piece goods as a result is effected in batches. Since the piece goods are transferred in each case to the conveying elements of individual conveying device, these can be conveyed in the conveying installation in an individual manner, batch-wise or in a continuous conveying stream.

The conveying installation and the slide mechanism and, as the case may be, also the processing device as well as, as the case may be, an intermediate conveyor are operated in a controlled and cyclically synchronous manner preferably via a common control device.

The conveying device according to the invention as well as the associated conveying installation are simply and robustly constructed and permit a reliable and smooth transfer and conveying operation. The maintenance expense is accordingly low. Moreover, the conveying installation is inexpensive in manufacture, since, e.g., the rail bodies are of standard profiles which are available on the market in any case.

Since the conveying vehicles are movable along a conveying path independently of one another, these can be moved, e.g., via points systems (diverter systems) along individual conveying paths, which are independent of other conveying vehicles.

The individualised conveying of individual products in a conveying installation thus opens up many possibilities on commissioning products. This the individual conveying vehicles can also be put together into groups without however linking the conveying vehicles to one another. Moreover, the conveying installation according to the invention also permits a buffering of the conveying vehicles and thus of the conveyed products.

It is evident that a chain conveyor is not suitable as a gravity conveyor with the characteristics mentioned above.

The device for the transfer of piece goods is likewise characterised by a comparatively simple and robust construction. The device is simply designed with regard to control technology and is accordingly reliable in operation, hardly prone to failure and is low in maintenance.

The device can be constructed in a very compact and space-saving manner since the piece goods are moved transversely to their longitudinal axis by the slide mechanism during the transfer. Thus, the intermediate conveyor and the conveying installation can be led past one another comparatively closely in the transfer zone.

BRIEF DESCRIPTION OF THE DRAWINGS

The subject-matter is hereinafter described in more detail by way of a preferred embodiment example which is represented in the accompanying drawings. In each case in a schematic manner are shown in:

FIG. 8: a device for the transfer of piece goods;

FIGS. 9 to 13: in each case, a lateral view of the device in the region of the transfer zone;

FIGS. 14 to 16: in each case, a front view of the device according to FIGS. 9 to 13;

FIG. 17: a front view of a rail-led conveying device with a rail body according to a further embodiment;

FIG. 18: a front view of a rail-guided conveying device with a rail body according to a further embodiment;

FIGS. 19 to 22: in each case, a lateral view of a further embodiment of a slide mechanism;

DETAILED DESCRIPTION OF THE INVENTION

Figure 1:
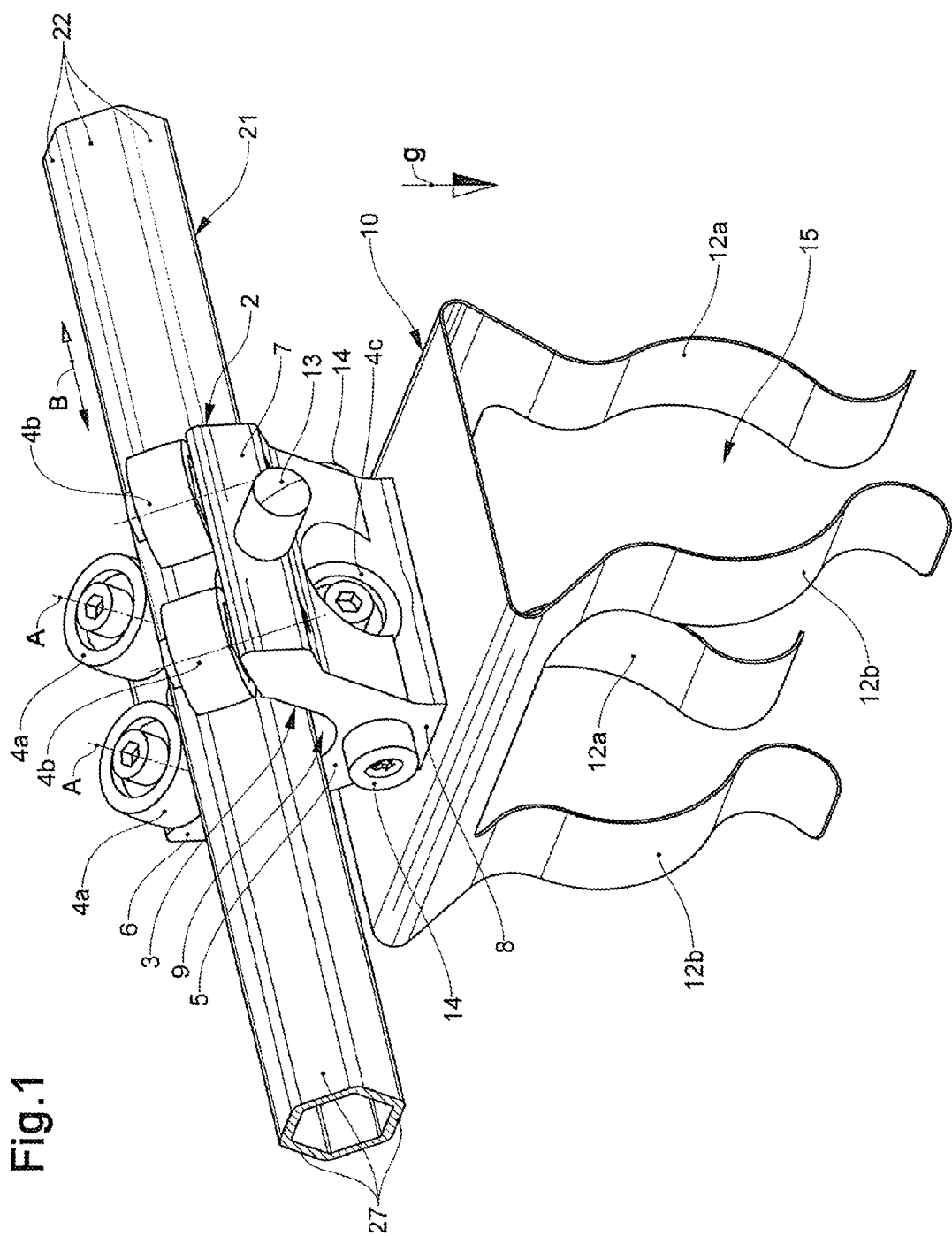
FIG. 1: a perspective view of a rail-led conveying device.

Basically, the same parts are provided with the same reference numerals in the figures. Certain features in the figures are not represented for understanding the invention. The described embodiment examples represent the subject-matter of the invention by way of example and have no limiting effect.

The conveying device 2 according to FIGS. 1 to 4 and 6 to 13 includes a conveying vehicle 3 that is guided as an outer runner on a rail body 21. The conveying vehicle 3 has a base body 5 with a first and a second vehicle limb 6, 7, which are connected to one another via an intermediate section 8.

A pair of first runner rollers 4a is arranged in a rotatably mounted manner on the end section of the first vehicle limb 6. A pair of second runner rollers 4b is arranged in a rotatably mounted manner at the end section of the second vehicle limb 7. The runner rollers 4a, 4b of the mentioned runner roller pairs are each arranged one after the other in the conveying direction B. Their rotation axes or rotation planes are parallel to one another. The paired arrangement of the first and second runner rollers 4a, 4b prevent a tilting of the conveying device 2 in the conveying direction B.

An individual third runner roller 4c is arranged in a rotatably mounted manner on the connection section 8. The rotation planes R of the first, second and third runner rollers 4a, 4b and 4c intersect in the rail receiving space at an angle of 120°.

As shown in FIG. 1, a rail body 21 in the form of a symmetrical hexagonal profile is led through the rail receiving space 9. The hexagonal profile 21 forms six profile surfaces 22, which are arranged uniformly around the periphery of the profile. These form a regular hexagon. These profile surfaces 22 are suitable as runner surfaces for the runner rollers 4a, 4b, 4c. The runner rollers 4a, 4b, 4c, however, in each case only lie on three of the in total six possible profile surfaces 22. These three runner surfaces 27 in each case mutually enclose an angle of 60°. This means that the first and the second, the second and the third as well as the third and the first runner surface 27 enclose an angle of 60°. The rail body 21 is encompassed by the runner rollers approximately without play.

The hexagonal profile 21 has a width across flats SW that corresponds to the distance between two profile surfaces lying opposite one another.

The rail body 21 is connected via a holder 25 to a support structure (FIG. 3), which is not explained in more detail at this location. The holder (mount) 25 is attached on the profile surface 22 of the rail body 21, which faces the opening between the two vehicle limbs 6, 7.

Figure 4:
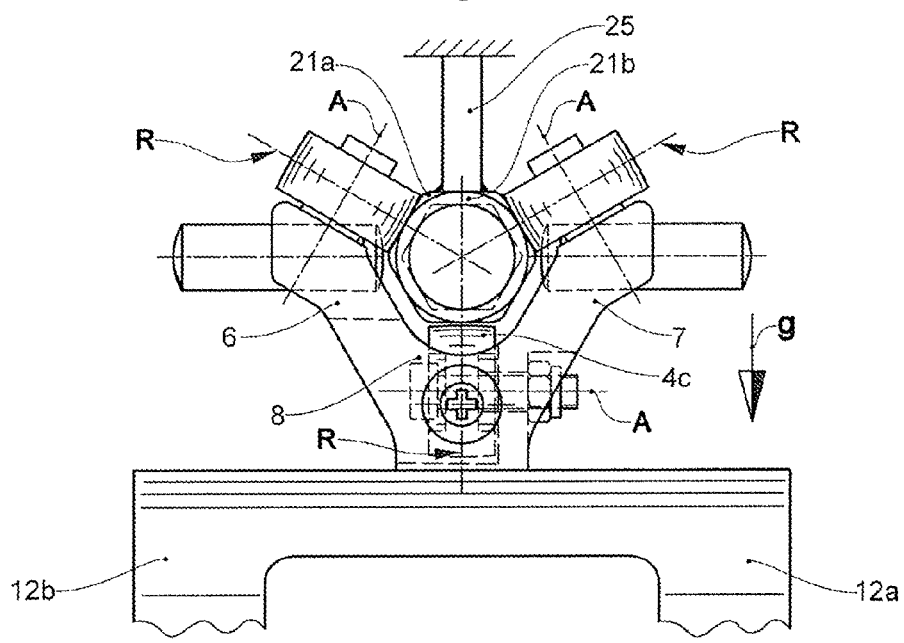
FIG. 4: a cross-sectional view of the rail-led conveying device according to FIG. 1, in the region of a cross-sectional change of the rail body.
Figure 5:
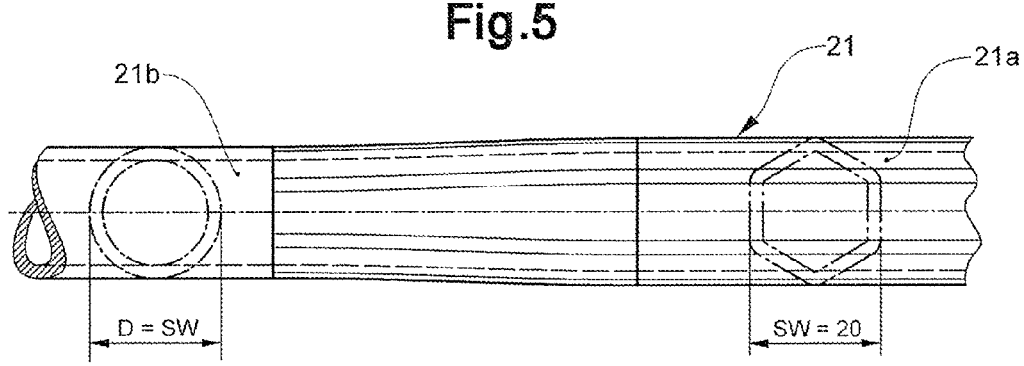
FIG. 5: a lateral view of a rail body.
Figure 6:
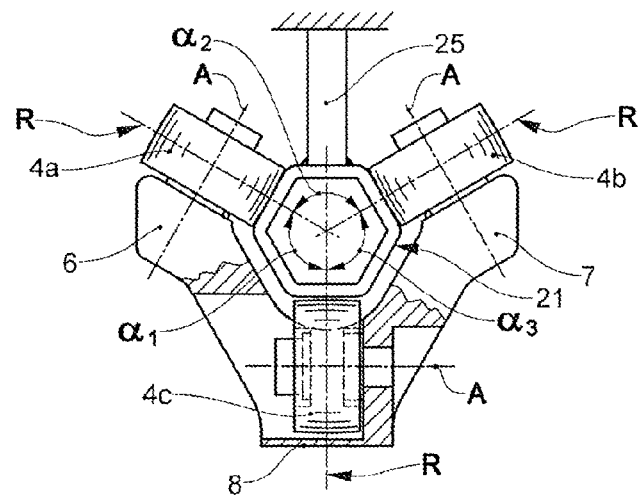
FIG. 6: a cross-sectional view of the rail-led conveying device according to FIG. 1.
Figure 7:
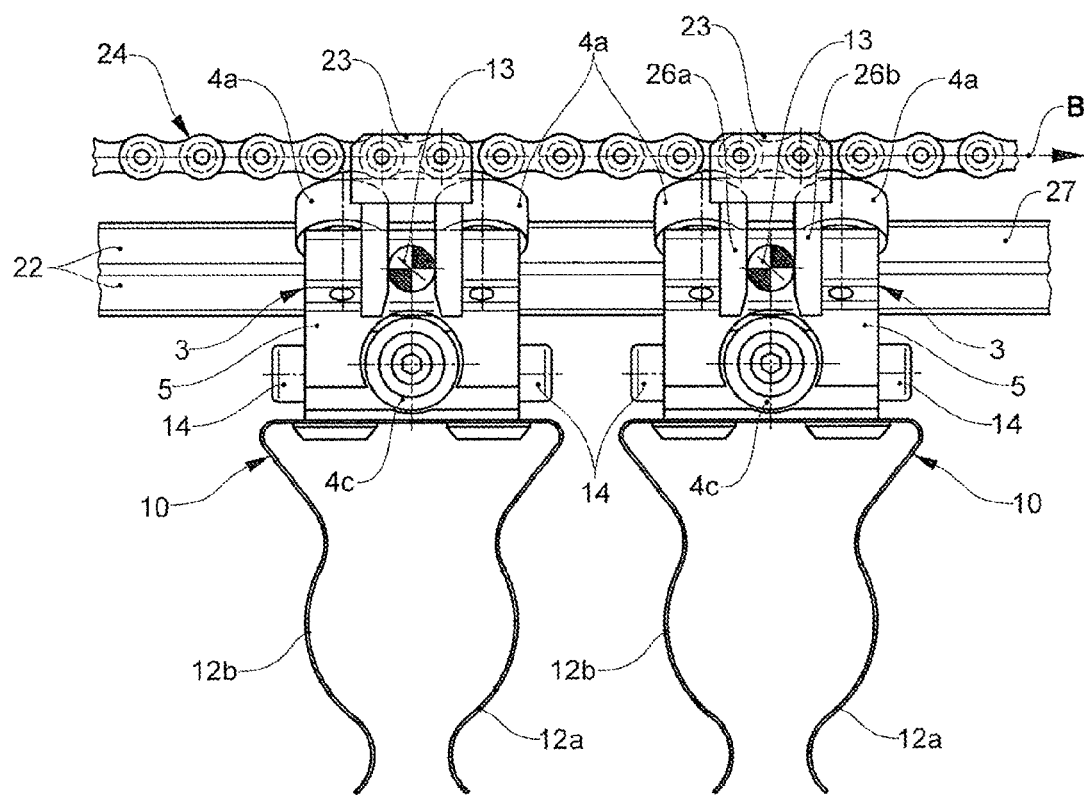
FIG. 7: a lateral view of the conveying installation from the region of the rail guidance.

The rail body 21 in sections can also be designed as a round profile (see FIGS. 4 and 5). The width across flats of the round profile corresponds to its outer diameter D. For this reason, the three runner rollers or runner roller pairings 4a, 4b, 4c can also be led on the round profile without play. The round profile section 21b, however, in contrast to the hexagonal profile section 21a, does not form a guide surface for the runner rollers but rather a guide line. In contrast to the hexagonal profile section 21a therefore the conveying device 2 is not torque-secured on the round profile section 21b. This means that the conveying device 2 is pivotable transversely to the conveying direction B or transversely to the longitudinal direction of the rail body 21, about the rail body 21.

The conveying element 10 is arranged below the rail body 21 in the hanging conveying. The two vehicle limbs 6, 7 are led upwards from below laterally past the rail body 21. The rotation plane R of the first and second runner rollers 4a, 4b runs obliquely from the top to the runner surface of the rail body 21. The two runner surfaces 27 for the two first and second runner rollers 4a, 4b are directly obliquely downwards.

The rotation plane R of the third runner rollers 4c is arranged in a perpendicular manner. The third runner roller 4c rolls above the rail body 21 on a runner surface 27, which is directed upwards.

A conveying element 10, which points away from the rail body 21, is releasably arranged on the connection section 8. The conveying element 10 is designed as a holding clip. The holding clip 10 has a pair of first clip limbs 12a and a pair of second clip limbs 12b that enclose a receiving region 15.

The holding clip 10 is designed of spring steel. The limb pairings 12a, 12b are accordingly spring-elastic, and permit a goods piece 70 to be held in a clamped manner by way of the exertion of a restoring force. For this, the holding clip 10 is designed such that the goods piece 70 at least slightly spreads the clip limbs 12a, 12b in the holding position. The goods piece 70 is held radially, i.e. on the outer radius, in a clamping manner.

In each case, a guide stud 13 projecting transversely to the longitudinal direction of the rail body 21 is arranged laterally on the first and second vehicle limb 6, 7 (see FIG. 1).

The conveying installation 1 moreover includes a drive chain 24 as well as drivers 23 fastened on the drive chain. The drivers 23 are actively driven via the drive chain. The drivers 23 in each case have two driver arms 26a, 26b that are spaced from one another. The driver arms 26a, 26b form an intermediate space, in which the driver receives the guide stud 13 (see FIG. 7).

If now the conveying device 2, for example, are to be led to a higher conveying level, then a driver 23 is fed to the conveying device 2, wherein the guide stud 13 is led between the two driver arms 26a, 26b. The conveying vehicle 3 is now carried along by the drivers 23 via the drive force acting through the driver arms 26a, 26b onto the guide stud 13.

The conveying vehicles 3 moreover have damping elements 14 on the front and rear side considered in the conveying direction, and these damp impacts when two conveying device moved independently of one another hit one another. The damping elements 14 can be studs of rubber-elastic material.

FIG. 8 schematically shows a device for the transfer of piece goods 70, in particular circularly cylindrical cartridges, to a conveying installation 1 of the type described above.

The device includes a processing device 61, e.g. a filling device. Moreover, the device includes a conveying installation 1 for conveying the piece goods 70 to a further-processing device, such as a packaging device (not shown). The device moreover includes an intermediate conveyor 50, which conveys the piece goods 70 from the processing device 61 to the transfer zone Z on the conveying installation 1.

In the processing device 61, more and more piece goods 70, here four, in the manner of a batch operation are simultaneously subjected to a processing step, e.g., filled with contents, such as a sealing mass. The processing is effected in a cycled operation. The piece goods 70, after completion of the processing step, are fed to goods piece receivers 51 of the intermediate conveyor 50. The goods piece receivers 51 are conveying elements of the intermediate conveyor 50 which are arranged one after the other in the conveying direction B.

The goods piece receivers 51 with the piece goods 70 are conveyed by way of intermediate conveyors 50 into the transfer zone Z of the conveying installation 1. The intermediate conveyor 50 is designed as a round course, which after the effected transfer of the piece goods 70 to the conveying installation 1, moves the goods piece receivers 51 back again to the processing device 61.

The intermediate conveyor 50 conveys the piece goods 70 batch-wise or charge-wise in a discontinuous manner into the transfer zone Z. This means that a conveying pause or break is applied between two conveyed charges of piece goods 70. Moreover, the piece goods 70 in the transfer zone Z assume an idle position during the conveying break before their transfer.

The charges of piece goods 70 are preferably conveyed in a regular cycle into the transfer zone Z.

A pneumatically operated slide mechanism 52 with a slide element 53 is arranged in the transfer zone Z. The slide element 53 includes a component that extends in the conveying direction B of the conveying device 2 and is with a longitudinally directed guide surface for the piece goods 70.

The conveying path of the conveying installation 1 leads through the transfer zone Z. Accordingly, conveying device 2 with holding clips 10 are moved through the transfer zone Z. The piece goods 70 are fed to the transfer zone Z in a cycled and batched manner.

The conveying installation 1 and the associated conveying device 2 have already been described in detail in the context of FIGS. 1 to 7. That which has been cited further above is referred to.

FIGS. 9 to 13 show the batch-wise transfer of piece goods to the conveying installation 1 in lateral views. The FIGS. 14 to 16 show the transfer of piece goods 70 to the conveying installation 1 according to the FIGS. 9 to 13, in front views.

The transfer is effected in a cycled manner, wherein the transfer according to FIGS. 9 to 13 and 14 to 16 corresponds to one transfer cycle.

The processing device 61, the intermediate conveyor 50, the conveying installation 1 and finally the transfer of piece goods 70 are operated cyclically synchronously to one another.

FIGS. 9 and 14 represent the beginning of a transfer cycle for the transfer of a group of three piece goods 70 to the conveying installation 1. The three piece goods 70 to be transferred, in the transfer zone lie ready for transfer in the idle position in three goods piece receivers 51. The number of piece goods 70 can of course also be greater or smaller than three and, for example, be two, four or five.

The goods piece receivers 51 are part of guide elements of an intermediate conveyer, which is not represented here in more detail, the guide elements being led by rollers (see FIGS. 14 to 16).

Conveying device 2 in each case with a holding clip 10 are moved by the conveying installation 1 into the transfer zone Z. In the present case, it is three conveying device 2, i.e. a conveying device 2 for each goods piece 70 lying ready.

While the conveying device 2 is moved through the transfer zone Z, the slide element 52 of the slide mechanism 52 is moved upwards in a linear movement H (FIG. 10). The piece goods 70 by way of the slide element 53 are lifted together upwards in the direction of the holding clips 10 moved through the transfer zone Z. The movement of the slide element 53 is matched to the movement of the holding clips 10 such that the upwardly moved piece goods 70 come together with the clip openings of the holding clips 10 and by way of continued movement of the slide element 53 are pushed into the holding clips 10 of the conveying device 2.

As soon as the piece goods 70 meet the clip opening of the holding clips 10 and come into contact with the holding clip 10, the conveying device 2 via the holding clip 10 exerts a driving force onto the piece goods 70 (FIG. 10). Since, however, the slide element 53 continues its movement upwards, in order to push the piece goods 70 completely into the holding position in the holding clips 10, the piece goods 70 move relative to the slide element 53 in the movement direction B of the conveying device 2 (FIGS. 11, 12 and 15).

With this procedure, the piece goods 70 slide in the movement direction B on the slide element 53.

The slide element 53 has two slider bars 65 that run at a distance to one another. The slider bars 65 are aligned in the movement direction B of the conveying device 2 and form a guide surface 54, which is also simultaneously a sliding surface for the piece goods 70.

The slider bars 65 are arranged on both sides of the receiver 51, from which the piece goods 70 are lifted for the purpose of transfer by the slide element 53. The slider bars 65 are lifted via pneumatic cylinders 64 for the transfer of the piece goods 70 and are lowered again for assuming the initial position of the slider bars 65. The pneumatic cylinders 64 are accordingly extended and retracted. The extension and retraction of the pneumatic cylinders 64 is effected via a suitable cam drive 63. The cam drive 63 is controlled via the control device 62.

As soon as the piece goods 70 have been pushed by the slide element 53 into the holding position in the holding clips 10, the slide element 53 moves in a linear movement H downwards again back into its initial position (FIG. 13). A new transfer cycle can be initiated on reaching the initial position. For this, goods piece receivers 51 with piece goods 70 are moved via the intermediate conveyor 50 into the transfer zone Z and are brought into an idle or waiting position for the transfer.

The transferred piece goods 70 are conveyed by the conveying device 2 in the conveying direction B along the conveying path of the conveying installation 1.

The filling device 61, the intermediate conveyor 50, the slide mechanism 52 as well as the conveying installation 1 are preferably controlled and operated in a cyclically synchronous manner, via a common control device 62.

FIGS. 17 and 18 each show front views of a rail-led conveying device according to a further embodiment example. The conveying device 2 corresponds essentially to the conveying device 2 according to FIGS. 1 to 3, which is why a repetition of the description of the same features is not made at this location. In contrast, the description with regard to FIGS. 1 to 3 is referred to.

Figure 2:
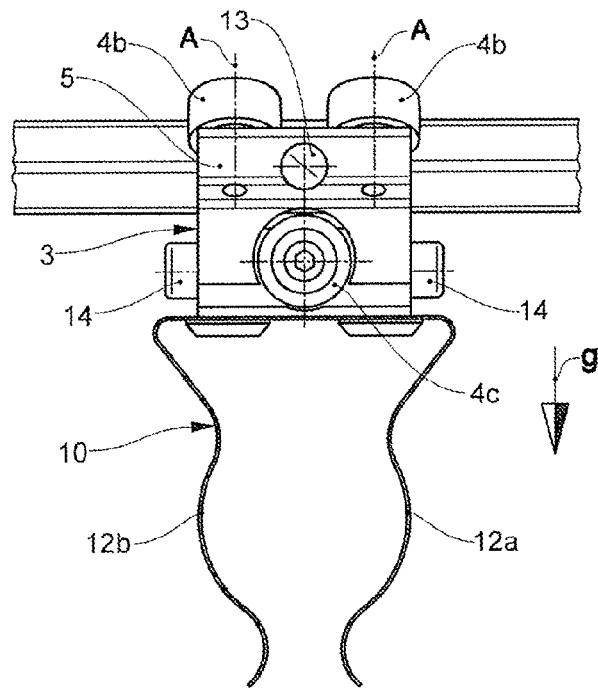
FIG. 2: a lateral view of the rail-led conveying device according to FIG. 1.
Figure 3:
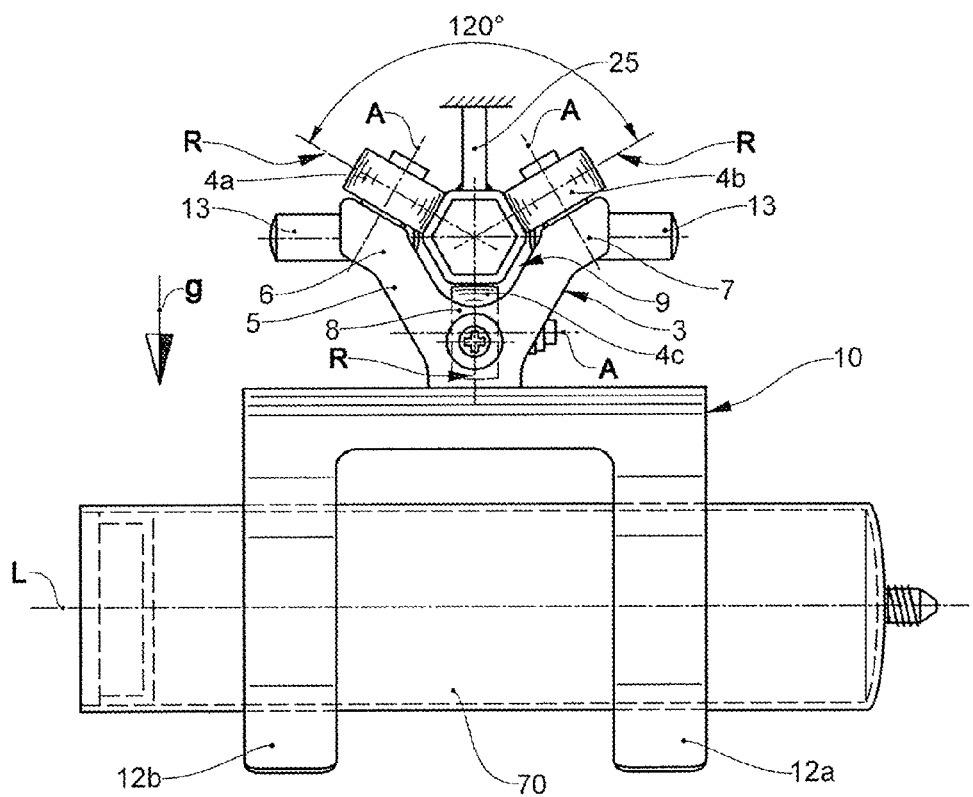
FIG. 3: a front view of the rail-led conveying device according to FIG. 1.

The embodiment according to FIGS. 17 and 18 differs from the embodiment according to FIGS. 1 to 3 only by way of the different design of the rail body and therefore also by way of the different arrangement of the runner rollers 4a, 4b 4c on the conveying vehicle 3.

The rail body 81 according to FIG. 17 is likewise designed as a hexagonal profile. The six profile surfaces, however, are not designed equally long. The profile cross section in the present embodiment example in contrast is extended in length. Accordingly, the hexagonal profile is merely designed in a mirror-symmetrical manner. The three profile surfaces forming runner surfaces, however, are likewise each arranged at an angle of 60° relative to one another. Accordingly, the rotation planes R of the runner rollers here too are also arranged at an angle of 120° relative to one another.

The rail body 82 according to FIG. 18 is likewise designed as a hexagonal profile. Here too however, the six profile surfaces are not designed equally long. The profile cross section in the present embodiment in contrast is extended in width. Accordingly, here too, the hexagonal profile is only designed in a mirror-symmetrical manner. The three profile surfaces forming the runner surfaces are, however, likewise arranged at an angle of 60° relative to one another. Accordingly, the rotation planes R of the runner rollers here too are arranged at an angle of 120° relative to one another.

FIGS. 19 to 22 show the transfer of piece goods 70 to the conveying installation in front views, wherein a slide mechanism 72 according to a further embodiment example is present as a single difference to the embodiment example according to FIGS. 11 to 16. Only the construction and the manner of functioning of the slide mechanism 72 are therefore described at this location. The description with regard to FIGS. 11 and 16 is referred to concerning the common features.

The slide mechanism 72 has two pivot elements 73, on whose distal ends the slide element 53 is attached. The slide element 53 is moved by way of the pivot movement of the pivot elements 73 along an arched path in a combined movement with a first movement component upwards in the direction of the conveying elements 10 and with a second movement component laterally in the conveying direction B of the conveying elements 10. The piece goods 70 that are moved by the slide element 53 out of the goods piece receivers 51 to the conveying elements 10 for the purpose of the transfer accordingly execute an analogous movement.

The additional lateral movement of the slide element 53 in the conveying direction B of the conveying element 10 during the lifting of the goods piece 70 supports the transfer of the goods piece 70, which executes an analogous lateral movement by way of the driving force of the conveying element 10 in the conveying direction B.

Figure 23:
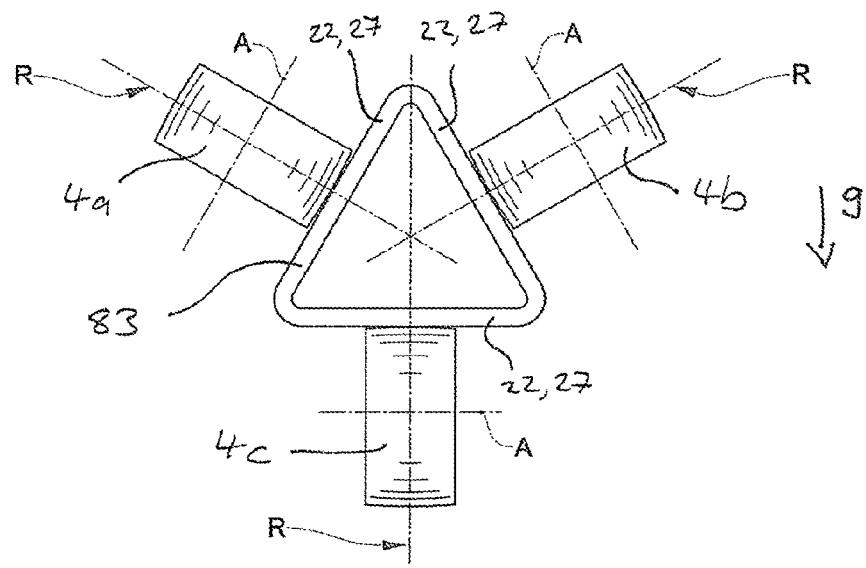
FIG. 23: a cross section through a further embodiment of a rail body.

The rail body 83 according to FIG. 23 is designed as a triangular profile. The triangular profile in a cross-sectional view forms an equilateral triangle. Accordingly, the three profile surfaces 22 that simultaneously form the three runner surfaces 27 for the runner rollers 4a, 4b, 4c are arranged at an angle of 60° to one another.

Figure 24:
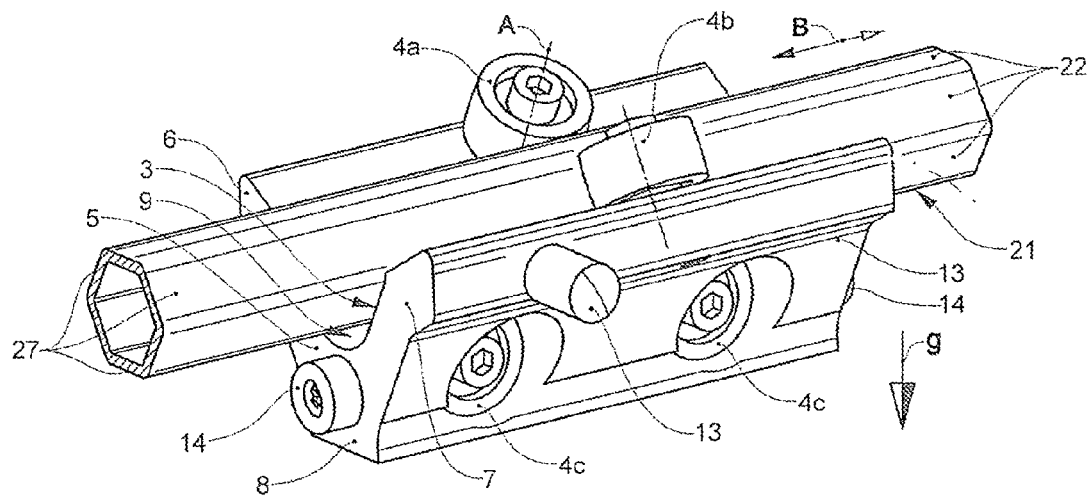
FIG. 24: a perspective view of a further embodiment of a conveying device.

The conveying vehicle 3 according to FIG. 24 differs from the conveying vehicle 3 according to FIGS. 1 to 3 in that two third runner rollers 4c are arranged one after the other in the conveying direction B, in the connection section 8 between the two vehicle limbs 6, 7. These two runner rollers 4c ensure that the conveying vehicle 3 cannot tilt in the conveying direction B. The conveying vehicle 3 is represented without a conveying element, In contrast, in each case only a first and second runner roller 4a, 4b are arranged on the first and the second vehicle limb 6, 7.

The invention claimed is:

1. A rail-led conveying vehicle with at least one first, second and third runner rollers that are each rotatably mounted about a pivot, for rolling conveying along a rail guidance, wherein:
    rotation planes of the at least one first, second and third runner rollers are arranged at an angle of greater than 0° and smaller than 180° relative to one another,
    the conveying vehicle comprises a first limb and a second limb, as well as a connection section connecting the first and second limbs to one another, wherein the first and second limbs and the connection section enclose a rail receiving space, and
    at least two first runner rollers are arranged on the first limb one after the other in a conveying direction of the conveying vehicle, at least one second runner roller is arranged on the second limb, and at least one third runner roller is arranged on the connection section, in a rotatably mounted manner.

2. The conveying vehicle according to claim 1, wherein the rail receiving space is open at one side and is for receiving a rail body, on which rail body the runner rollers can roll, and the at least one first, second and third runner rollers is arranged on the conveying vehicle such that their rotation planes intersect in the rail receiving space.

3. The conveying vehicle according to claim 1, wherein a conveying element for holding a goods piece is arranged on the connection section.

4. The conveying vehicle according to claim 3, wherein the conveying element is a holding clip.

5. The conveying vehicle according to claim 1, wherein a contact element for creating a contact to a driver for the purpose of driving the conveying vehicle by way of the driver is arranged on the conveying vehicle.

6. A conveying installation comprising a plurality of rail-led conveying vehicles according to claim 1, as well as a rail guidance with a rail body, wherein:
    the rail body forms at least one rail body longitudinal section with at least three runner surfaces that are arranged on the outer periphery of the rail body and are for the at least one first, second and third runner rollers of the conveying vehicle, and the surface normals of the at least three runner surfaces are arranged at an angle of greater than 0° and smaller than 180° to one another.

7. The conveying installation according to claim 6, wherein the rail body longitudinal section has a symmetrical cross section.

8. The conveying installation according to claim 6, wherein the rail body longitudinal section is a hexagonal profile with six profile surfaces, and the at least three runner surfaces are formed by profile surfaces.

9. The conveying installation according to claim 8, wherein adjacent profile surfaces in each case are arranged at an angle of 120° to one another.

10. The conveying installation according to claim 6, wherein the at least three runner surfaces are formed by three profile surfaces that are arranged at angles to one another.

11. The conveying installation according to claim 6, wherein the rail body comprises at least two rail body longitudinal sections with a different profile cross section.

12. The conveying installation according to claim 11, wherein the rail body comprises a further rail body longitudinal section, which is designed as a round profile.

13. The conveying installation according to claim 6, wherein the conveying vehicle laterally encompasses the rail body with the first and second limbs and the at least one first, second and third runner rollers are led in a rolling manner on the runner surfaces of the rail body.

14. The conveying installation according to claim 6, wherein the conveying installation is a hanging conveyor, in which the piece goods at least in sections can be conveyed in a hanging manner.

15. The conveying installation according to claim 6, wherein the conveying installation is a gravity conveyor, in which the piece goods can be conveyed along at least one conveying path section in a manner driven by gravity.

16. The conveying installation according to claim 6, wherein the first and second limbs and the connection section of the conveying vehicle in the hanging conveying form a rail receiving space that is open to the top and is for receiving the rail body, and the connection section is arranged below the rail body.

17. The conveying installation according to claim 6, wherein the rail body and the conveying vehicle are designed such that a torque acting on the conveying vehicle can be dissipated onto the rail body in a manner uniformly distributed over the at least one first, second and third runner rollers.

* * * * *